May 3, 1960 W. J. METZGER 2,935,211
CAR COUPLER
Filed Jan. 13, 1958 2 Sheets-Sheet 1

INVENTOR.
WILLIAM J. METZGER
BY Henry Kozak
ATTORNEY

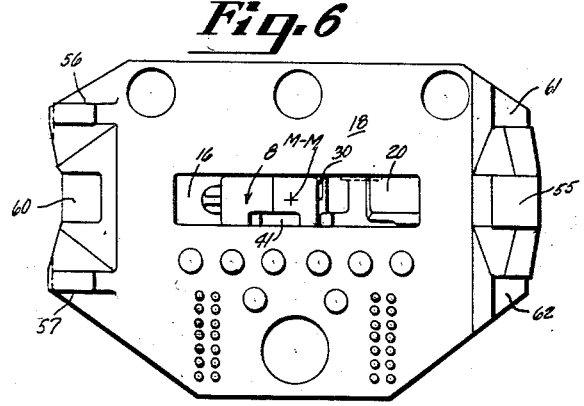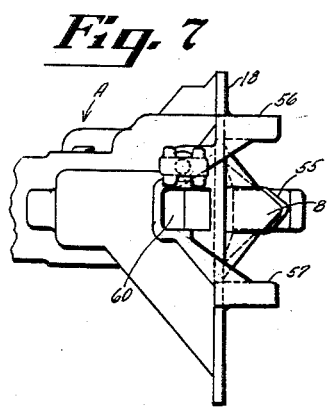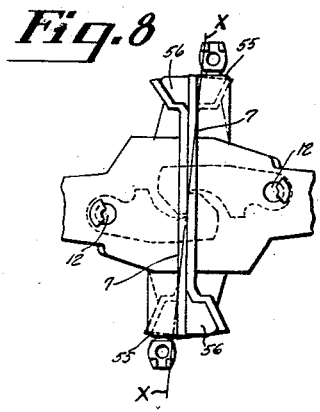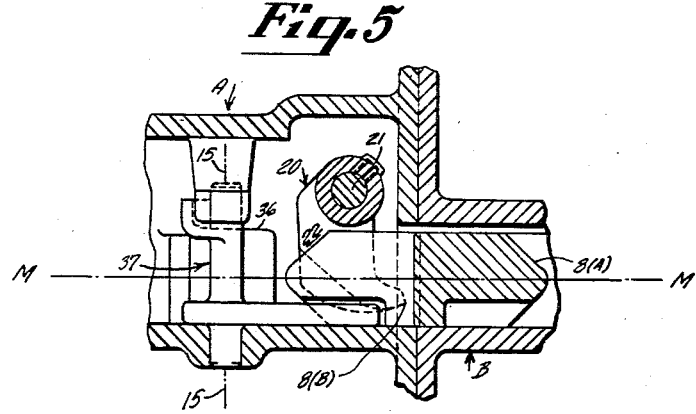

United States Patent Office 2,935,211
Patented May 3, 1960

2,935,211

CAR COUPLER

William J. Metzger, East Cleveland, Ohio, assignor to National Malleable and Steel Castings Company, Cleveland, Ohio, a corporation of Ohio Application January 13, 1958, Serial No. 708,632

10 Claims. (Cl. 213—100)

This invention relates to automatic tight-locking couplers adapted for use on railway trains, and particularly to a self-adjusting mechanism embodied in such couplers for keeping a coupled pair thereof in slack-free connection regardless of wear.

This application is a continuation-in-part of my co-pending application Serial No. 613,133, filed October 1, 1956.

The couplers which incorporate the present invention are extremely tight-coupling and particularly useful in providing service connections integral with the coupler for forming joints, e.g., in electric, air and steam transmission lines. To maintain such joints in efficient and positive connection and free from excessive wear, it is essential to eliminate excessive movement, either longitudinally or laterally with respect to the draft axis of the couplers, between the mating portions of the service-line joints as carried in opposing abutment members of the couplers. In prior co-pending applications, Serial No. 671,553, filed July 12, 1957, and supra, relating to couplers of the type herein disclosed, structure is described which effectively eliminates appreciable relative lateral movement of coupled couplers; take-up structure for eliminating longitudinal slack as described herein is not disclosed or claimed in these applications.

The primary object of this invention is to provide a self-adjusting mechanical system for eliminating any longitudinal slack which might otherwise occur between coupled couplers having opposed engageable abutment surfaces for maintaining a rigid alignment of the couplers.

Another object is to utilize the locking mechanism of each coupler as essential components in the slack take-up system of a coupling of the tight-lock type.

Other objectives ancillary to the above objects are: to provide an arrangement of coupler parts rendering the locking mechanism easily operative in uncoupling one coupler from another, and to render the slack take-up system irreversible regardless of the draft forces imposed on a coupling during use.

In brief, the present invention fulfills these objects by provision of a coupler of the type having an abutment face plate or other abutment means through which extends a hook-shaped member, and a lock adapted to co-operate with the member to hold the similar member of another coupler therebetween; the lock and the hook-shaped member of one coupler being contoured to co-operate with their respective counterparts of another coupler to maintain the hook-shaped members and the opposing abutment surfaces of both couplers, when coupled, in tight engagement. The hook-shaped member (hereinafter called the hook member) has a leg portion anchored pivotably within the coupler head and extends forwardly through the abutment face or member of the coupler substantially exposing the neb portion of the member forwardly of the abutment surface. The neb portion has a rearwardly facing pulling surface disposed with respect to the length of the coupler in or adjacent the plane of the abutment face.

The neb pulling surfaces of a pair of coupled couplers engage along a connecting plane approximately containing the pivotal axes of both hook members. Either pulling surface of the coupled couplers extends diagonally forwardly from a point adjacent the leg portion of the respective member at a small angle with a perpendicular to such connecting plane and cross-wise of the connecting plane. The plane of engagement of the pulling surfaces is thus diagonal with respect to the connecting plane. The plane of the engaged pulling surfaces may also, but not necessarily, be aligned slightly diagonally with respect to the plane of engagement of the abutment members to align the pulling surface of each hook member forwardly from its end adjacent the leg portion of such member.

A further essential feature of the slack take-up system consists of the shapes of the inter-engaging surfaces of the hook member and the lock. These surfaces are shaped and arranged to establish cam relationship between the opposed surfaces of the lock of one coupler and the hook member of a similar coupler inserted between the member and the lock of the first coupler. These surfaces, when engaged, extend forwardly with respect to the longitudinal shank-to-abutment face direction of the coupler within which they occur and laterally outwardly with respect to the draft axis of the coupled coupler in order that the lock will take up any slack which develops between the lock and the member as the members rotate toward each other.

In the drawing with respect to which the invention is described:

Fig. 5 is a fragmentary elevation in section taken along line V—V of Fig. 1;

Fig. 6 is a front face elevation of either one of the couplers shown in Fig. 1;

Fig. 7 is a fragmentary side elevation of one of such couplers; and

Fig. 8 is a fragmentary plan view of the couplers shown in Fig. 1.

Figure 1:
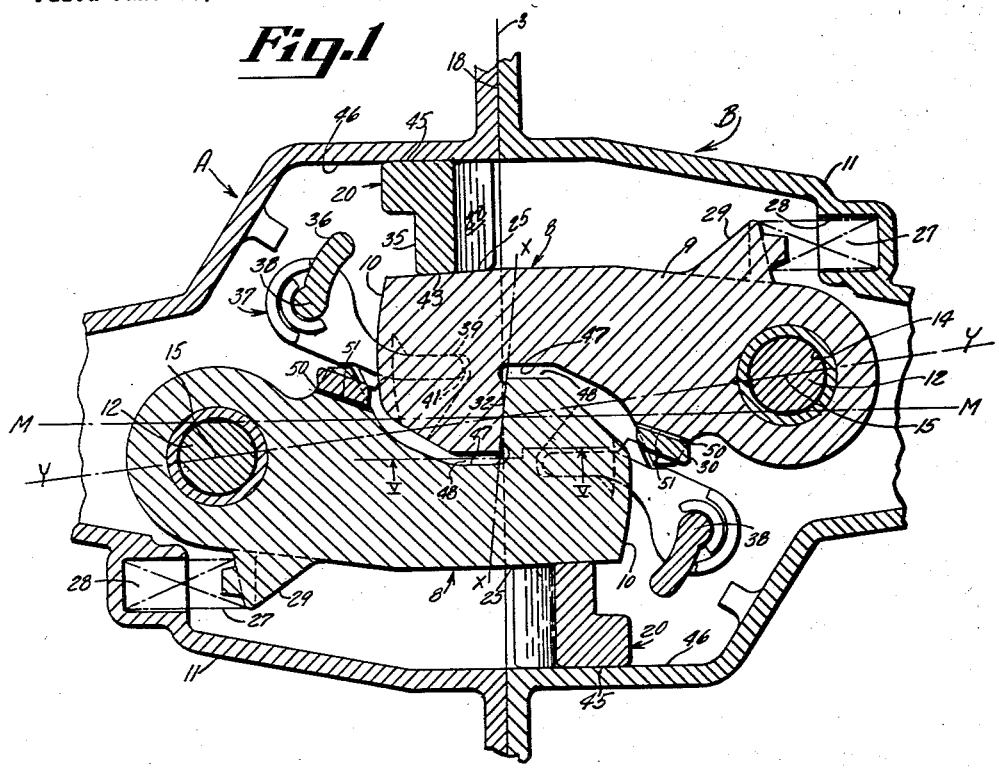
Fig. 1 is a fragmentary sectional plan view of a pair of coupled couplers, embodying individually and jointly the slack pick-up system of the present invention.

Considering the invention now in more detail, Fig. 1 represents couplers A and B as engaged along a plane 3 of abutment along which the abutment plates or members 7 (see Fig. 8) are normally tightly engaged by the operation of the slack-eliminating system to be described. Couplers A and B are held with respect to draft axis M—M in coupled relationship by hook-shaped members 8, each of which comprises a leg portion 9 and a neb portion 10. Extending through the bottom and top walls of the coupler head 11 is a pin 12 which extends also through an aperture 14 extending through a rearward portion of the leg portion 9. The member 8 extends forwardly from its pivot axis 15 through an opening 16 (see Fig. 6) to dispose substantially all of the neb portion of the member forwardly of the abutment face 18 of the coupler in which it is anchored.

Figure 2:
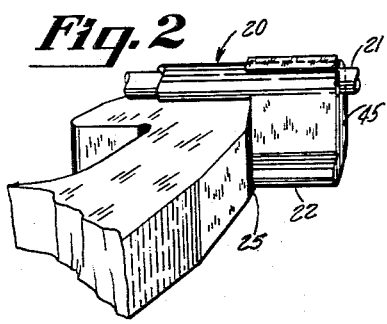
Fig. 2 is a fragmentary perspective view of a lock and a hook member in the position found in either one of the couplers shown in Fig. 1.
Figure 3:
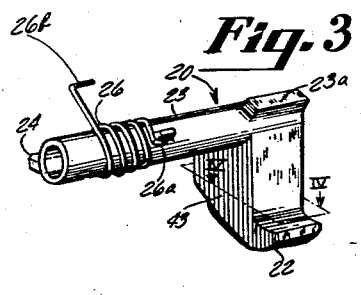
Fig. 3 is a perspective view of the lock included in the apparatus of Figs. 1 and 2.

Within the head 11, rearwardly of one end portion of the opening 16, a lock 20 is rotatably supported on a shaft 21 extending in a direction generally perpendicular to the direction of the axis 15 (see Fig. 5). The lock 20 has a body or element 22 eccentrically disposed with respect to the axis of the shaft 21 and adapted to swing into and out of a position (as shown in Figs. 1, 2, and 5)

wherein, e.g., the hook of the coupler A may engage the hook 8 of the coupler B inserted as shown between the hook and the lock of coupler A. The surface of the hook member engaged by the lock is the straight outer or outboard surface 25.

The lock 20 has a tubular hub 23 through which extends the axle 21 keyed to the lock within a keyway provided by the hollow lug 23a. Another lug 24 projects from tube 23 (for limiting the rotation of the lock corresponding to forward movement of body or element 22) by rotating into engagement with the upper surface of the hook member 8 of the same coupler. Preferably the weight distribution of the lock is such as to cause rotation thereof carrying the body 22 forwardly toward the opening 16. Such rotation of the lock may also be obtained in part or entirely by means such as a spring 26, one end 26a of which is held by a lug on the lock hub 23 and the other end 26b held by engagement with the ceiling of the coupler head.

As shown in Fig. 1, the hook member 8 is urged counterclockwise about its axis 15 in either coupler A or B by a spring 27 having one end seated in a pocket 28 provided by the wall of the head 11, and its other end in engagement with a lug 29 extending laterally outwardly from the outboard side of the member 8. The movement of the member 8 is limited in a counterclockwise direction (except for engagement with the member 8 of another coupler) by a stop lug 30 extending from the ceiling or top wall of the head 11. As shown in Fig. 1, the members 8 of couplers A and B do not engage respective stop lugs 30 because of impingement of the pulling surface 32 of one coupler with the corresponding pulling surface of the other coupler.

To uncouple the coupling shown in Fig. 1, the lock of either coupler A or B is rotated to impel the body 22 thereof backwardly from the abutment plane 3 so that the hook member 8 of the other coupler is free to move into the space vacated by the lock body. In moving backwardly and upwardly, the lock body 22, i.e., the surface 35 thereof, engages the spur 36 of the hook-thrower 37, thereupon rotating the thrower in a counterclockwise direction, as viewed in either coupler of Fig. 1, about its pivotal axis at 38. The thrower 37 has another extension or spur 39 which extends into a recess 41 (see Fig. 6) provided in the neb portion of the hook member extending rearwardly, as shown from a front lower face area of the member. Hence the lock, when rotated as described, acts positively on the thrower to move the member 8 of one coupler out of engagement with the member of the other coupler.

Proceeding now to the specific features which result in the present invention, that is, those features that cause the couplers A and B to be automatically self-tightening with respect to any longitudinal slackness in the coupling comprising the couplers, a desired alignment of the pulling surfaces 32 is essential in this regard. Accordingly, these surfaces are aligned when the hook-shaped members 8 are engaged, as shown in Fig. 1, so that each pulling surface 32 extends from adjacent the leg portion of its respective pulling member transversely of a plane Y—Y containing the pivotal axes of the hook members of both couplers and forwardly at a small angle with a perpendicular to the plane Y—Y. Obviously, the hook members are in cam relationship and may be urged about their axes toward each other to pull the couplers toward each other and into tighter engagement. Both members 8 are subjected simultaneously and continuously to rotative force by the springs 27 of respective couplers and have the desirable characteristic of adjusting equally about their axes to align each surface 32 along whatever plane of engagement (see plane X—X) the condition of wear in the couplers requires the hook members to engage.

Another essential feature of the slack take-up mechanism is the inclination of the plane of engagement of the lock 20 with the hook member 8 with the direction of forward movement of the body portion 22 of the lock. This plane is established by the inboard surface 43 of the lock of one coupler (i.e., the surface of the lock facing inwardly toward the draft axis) and the outboard surface 25 of the member 8 (surface facing away from the draft axis) of the other coupler. As shown, the axis of the lock is parallel to the plane of engagement 3 or the abutment face 18 of the same coupler.

Figure 4:
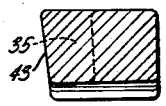
Fig. 4 is a sectional plan view of a portion of the lock as viewed along plane IV—IV of Fig. 3.

The essential contribution of the relationship of the lock with the member 8 is that the lock is able to rotate to shift the wedge-shaped body 22 thereof (see Fig. 4) forwardly by gravity or spring action between the member 8 and the adjacent head-wall surface 46 to eliminate any slack between the lock and the member, particularly when the member of the other coupler moves inwardly toward the draft axis. There is essentially a cam relationship between the lock of one coupler and the member 8 of the other coupler requiring the surface 43 to be inclined outwardly and forwardly with respect to the forward direction of the coupler. The surface 25 of the hook member of the similar coupler engaged by the surface 43 is also inclined in the same direction.

The lock may be held from shifting laterally, as shown, by engagement of its outboard side surface 45 with the inner surface 46 of the lateral wall of the coupler. Impingement of these two surfaces adds to the frictional resistance between the surfaces 43 and 25, thereby opposing any force imposed by the member 8 upon the lock tending to force it backwardly. The parts of the coupler are normally made of cast steel, providing ample friction to render the lock mechanism irreversibly resistant to any cam forces developed in the slack take-up system during service.

For certainty that the couplers will be able to readjust as wear or slack develops, the neb portions of the members 8 are sufficiently foreshortened to provide a gap 48 between the laterally-facing end surface 49 of the neb portion 10 of one coupler and the opposing surface 47 of the leg portion of the other coupler.

At a distance relatively closer to the pivot axis 15 of the member 8 than the clearance 48, a clearance or gap 50 is provided between the stop lug 30 and an abutment surface 51. Preferably, the sum of the widths of the two clearances 50 in a coupling comprising couplers A and B may compare with the width of the gap 48 in the ratio of the distance of one clearance 50 divided by the distance of the gap 48 from the axis 15. As a practical expedient, the sum of the clearances 50 may be slightly smaller than indicated by this ratio to prevent actual engagement of the neb surface 47 with the leg of the opposing member 8 so that as wear progresses in the coupler, the clearance 50 closes before the gap 48 is closed. The servicing of the coupler may be effected when it is observed that the clearances 50 have become closed.

As the arrangement of the members 8 in a pair of interlocked couplers, as illustrated in Fig. 1, orients the draft force transmitted from one coupler to the other from the pivot axis of one hook member to the corresponding pivot axis of the other coupler, such force is aligned in plane Y—Y on a bias with the main draft axis M—M of the coupling. Thus, the force transmitted through the hook members tends to move one coupler in a lateral direction relative to the other. It is essential that the couplers interlock in a manner to prevent relative lateral movement. For this and other purposes, each coupler (see Figs. 6, 7 and 8) is provided with aligning structure, such as projections 55, 56 and 57, extending forwardly from the face 18 of the coupler. Each coupler is provided with pockets 60, 61 and 62 disposed relatively to the projections of the coupler to receive the projections of a similar coupler mated therewith, as shown in Fig. 8, with projections of the first coupler extending into the pockets of the second coupler.

The pocket and projections of similar couplers may be spaced and formed with any degree of accuracy needed to eliminate relative movement in any direction extending transversely of a draft axis along which they are coupled.

When the couplers A and B are separated, the hook members 8 rest against respective lugs or stops 30. In operation, separated couplers approach each other generally along a path, such as represented by the draft axis M—M. On account of some misalignment of the couplers generally present, initial engagement occurs between the tapered sides of pockets on one coupler and the tapered sides of the projections on the other coupler which guide the couplers into aligned engagement. Following such initial engagement, the hook members engage and thrust each other sidewise, causing the hook member of one coupler to enter the space occupied by the lock body 22 of the other coupler and to thrust the lock body backward. The lock, in turn, engages the spur 36 of the thrower 37 to thereby place the spur 39 thereof in position for entering the recess 41 of the member 8 of the other coupler.

The neb portions of the hook members pass by each other during their approach to a coupled position and because they are urged by the springs 27, the hook members 8 snap into place, as shown in Fig. 1, with the surfaces 32 wedged together. Simultaneously, as the surfaces 32 engage, the lock bodies 22, having been previously swung backwardly and upwardly, descend or rotate through gravity into their forward positions, as shown in Fig. 1. In so doing, each lock body becomes wedged between the inner surface 46 of its respective head and the surface 25 of the other coupler. The locks 20 tend to tighten the engagement of the pulling surfaces 32. The weight distribution of the locks 20 is such as to force the lock bodies further forward by gravity to take up any slack between the members 8 as wear develops in the coupling, e.g., at the surfaces 32, or in the mutually-engaged bearing surfaces of the pin 12 and the bearing 14 therefor of the member 8. Of further aid in making the coupling tighter is the continuously applied torque exerted by the springs 27. Uncoupling is performed in a manner similar to that described in the applications hereinbefore mentioned.

The terms and expressions which have been employed are used as terms of description and not of limitation and there is no intention of excluding such equivalents of the invention described or of the portions thereof as fall within the purview of the claims.

What is claimed is:

1. A car coupler comprising: a head having forwardly-facing abutment means adapting the coupler to engage corresponding means of another similar coupler whereby both couplers are aligned longitudinally relative to a draft axis; a hook-shaped member having a rearward leg portion and a forward transverse neb portion providing a rearwardly-facing pulling surface, the member being pivotally secured by its leg portion to the head and extending forwardly through an opening in the abutment means to dispose the neb portion substantially forwardly of said means; said pulling surface, when engaged by the corresponding pulling surface of a similar coupler coupled with said coupler, extending from adjacent the leg portion crosswise of a connecting plane approximately containing said pivotal axis and the corresponding pivotal axis of said similar coupler in a direction inclined at a small angle forwardly with respect to a perpendicular to said plane; locking means mounted in the head for movement along a path between a rearward unlocking position and a forward locking position laterally spaced from said member in which the locking means engages in cam relationship the lateral surface of the corresponding member of a similar coupler intercoupled with said coupler; means for urging the locking means into locking position; resilient means for urging the first member toward said locking means in its locking position; and a thrower pivotally mounted in the head having, at the positions of said first member and the locking means when said couplers are intercoupled, a first spur projecting into the region between the first member and the locking means, and a second spur projecting into said path whereby the thrower is engaged and rotated by the lock in moving to its rearward position; the neb portion of the first member being recessed inwardly from a forwardly facing surface to receive the spur of a similar coupler corresponding to the first named spur.

2. The car coupler of claim 1 wherein: said pivotal axis thereof is spaced from the draft axis, and the connecting plane extends forwardly from said pivotal axis obliquely across the draft axis.

3. The car coupler of claim 2, wherein: said abutment means adapts the coupler to engage corresponding means of another similar coupler along a plane of engagement normal to the draft axis; and the draft aixs, the plane of engagement, the connecting plane, and said pulling surface extend approximately through a common intersection.

4. The car couper of claim 1 wherein: said locking means comprises a portion adapted to move forwardly into wedging relation with an adjacent lateral surface of the member of the coupler coupled to said coupler; at least one of the engaging surfaces being inclined forwardly with respect to the said coupler and laterally outwardly with respect to the draft axis.

5. The coupler of claim 1, wherein: said locking means comprises an element rotatable about an axis extending transversely to the draft axis and said pivotal axis into and out of engagement with said lateral surface of the member of said similar coupler coupled to said coupler.

6. The coupler of claim 5, wherein: said means for urging rotation is provided by the weight distribution of the locking means.

7. The coupler of claim 5, wherein: said means for urging rotation comprises spring means acting on the locking means.

8. The coupler of claim 5, wherein: the opposed surfaces of the element and the hook-shaped member are substantially flat and parallel in their respective coupler-coupled positions for face-to-face engagement and extend in the forward direction of said coupler and at an angle laterally away from the draft axis.

9. The coupler of claim 8, wherein: the side of the element opposite to that for engaging the member engages an inner surface of the adjacent lateral wall of the head.

10. The car couper of claim 2, wherein: said abutment means is provided with a forwardly-facing surface lying substantially in an abutment plane when engaged with the corresponding forwardly-facing surface of said other coupler; and the abutment means comprises a projection spaced from one side of said connecting plane, and a recess spaced from the other side of the connecting plane adapted to mate with the corresponding recess and projection, respectively, of said other coupler.

References Cited in the file of this patent

UNITED STATES PATENTS

| 1,131,194 | Wuerpel | Mar. 9, 1915 |
| 1,249,319 | Brown | Dec. 11, 1917 |
| 2,214,036 | Van Dorn | Sept. 10, 1940 |